Sept. 10, 1968    J. H. CRANKSHAW    3,400,937
SEALING ARRANGEMENT

Filed March 11, 1965    3 Sheets-Sheet 1

INVENTOR.
JOHN H. CRANKSHAW

INVENTOR.
JOHN H. CRANKSHAW

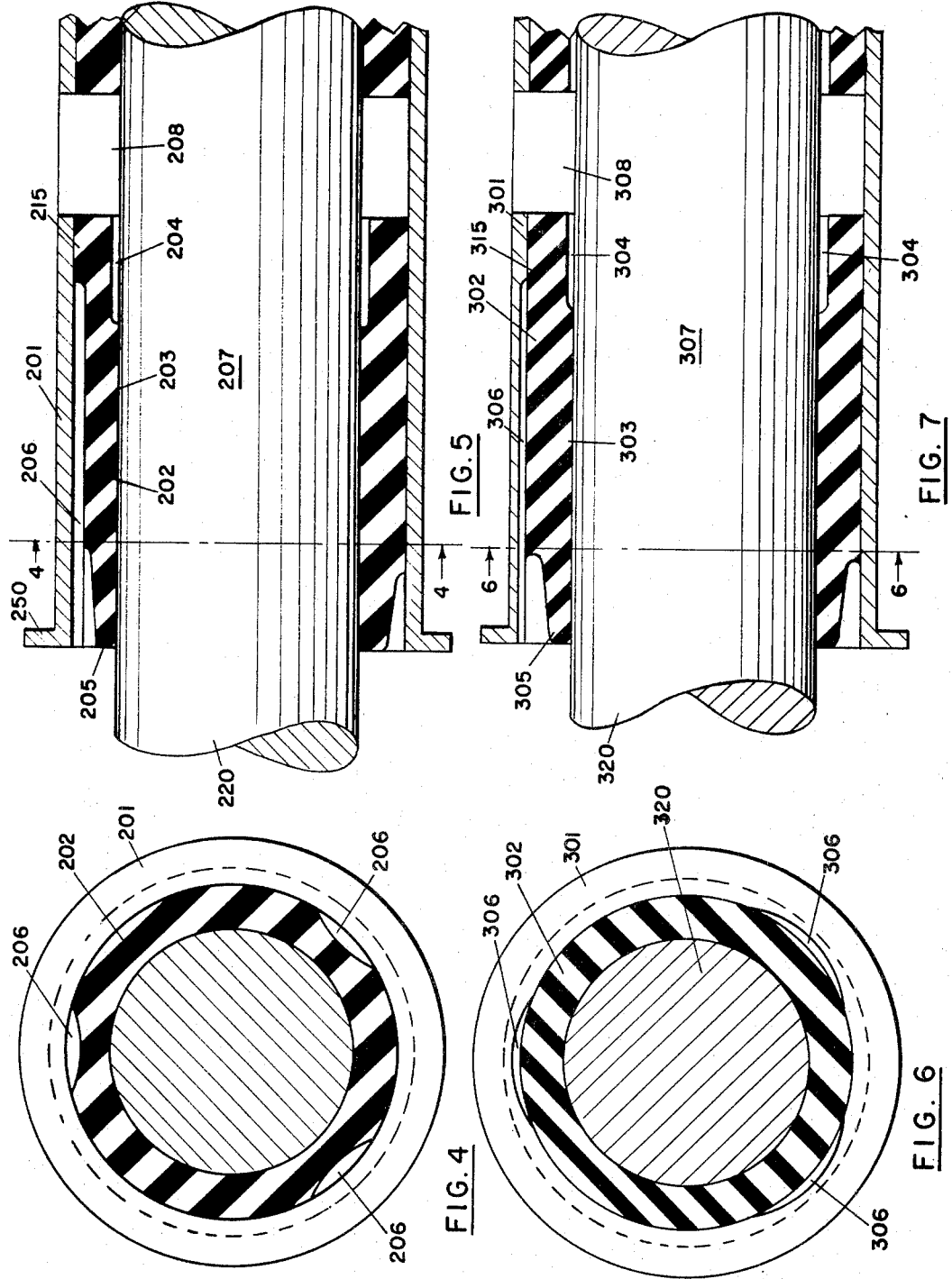

United States Patent Office 3,400,937
Patented Sept. 10, 1968

3,400,937
SEALING ARRANGEMENT
John H. Crankshaw, 439 Shawnee Drive,
Erie, Pa. 16505
Filed Mar. 11, 1965, Ser. No. 438,903
6 Claims. (Cl. 277—3)

ABSTRACT OF THE DISCLOSURE

A shaft seal on a shaft wherein the seal is of resilient material and has circumferentially spaced rigid members imbedded therein so that the areas between the rigid members are rendered soft and deform to provide a passageway for lubricant.

This invention relates to bearings and seals and, more particularly, to bearings and seals suitable for operation with high differential pressures, as for example, in the stern tube of a deep diving submarine or the like.

With the advent of modern submarines, it is necessary to have stern tube bearing seals having capabilities of withstanding pressures in excess of those which commercially available seals and bearings will withstand.

In the past stern tube bearings and stern tube seals have been separate entities. Conventional water lubricated neoprene or rubber stern tube bearings have been designed to use long, narrow, staves having substantial space between staves in a circumferential direction. Even in smaller bearings where the bearing is in one piece instead of being composed of several separate staves, standard practice requires the use of longitudinal grooves of substantial cross section through which lubrication and cooling water is circulated. The cross section is relatively large in order that foreign material may be flushed through the bearing without damaging it.

The load carrying capacity of the present bearing construction is relatively low requiring large bearings in which equal load distribution is impossible.

In the bearing disclosed herein the bore of the bearing is unbroken by any grooves and lubrication and cooling water circulation is achieved by permitting areas of radial softness. This allows a bearing of essentially zero radial clearance to provide for itself that space necessary to pass sufficient liquid for lubrication and cooling requirements. Since the bore of the bearing requires no grooves, it is relatively easy to combine a lip-type seal in the elastic material at the bearing ends, to perform the sealing function when the shaft is at rest and the cooling water supply is shut down.

While the bearing disclosed herein is described with regard to a marine application, the concept of radially soft areas in the bearing to permit the passage of lubricant is not limited to this type of application, nor is it essential that the seal be a necessary part of the device. The removal of the longitudinal grooves and the confinement of the portion of elastic material that is carrying a load permits a substantial increase in the unit load carrying capacity of this bearing.

It is, accordingly, an object of the invention to provide an improved water lubricated bearing.

Another object of the invention is to provide a water lubricated bearing having areas of radial softness to provide improved bearing surfaces.

Another object of the invention is to provide a water lubricated bearing which requires no grooves on the inside thereof for water passage therethrough.

Another object of the invention is to provide an improved combination water lubricated bearing and seal.

Yet another object of the invention is to provide an improved water lubricated bearing having cooling means built thereinto.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

FIGS. 5 and 7 are longitudinal views of another embodiment of the invention; and FIGS. 4 and 6 are views taken on lines 4—4 and 6—6 of FIGS. 5 and 7 respectively.

Figure 1:
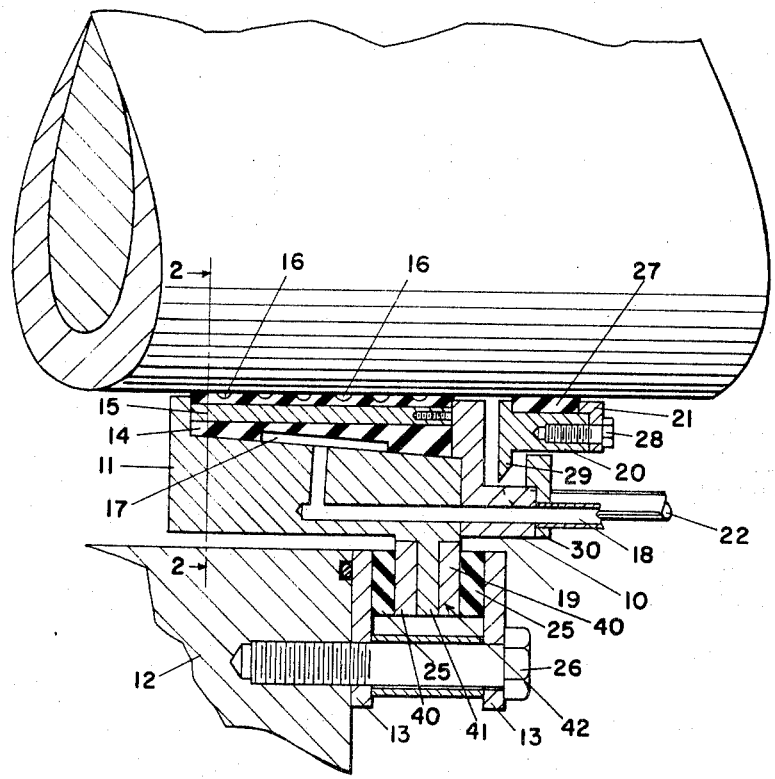
FIG. 1 is a longitudinal partial cross sectional view of a bearing according to the invention.
Figure 2:
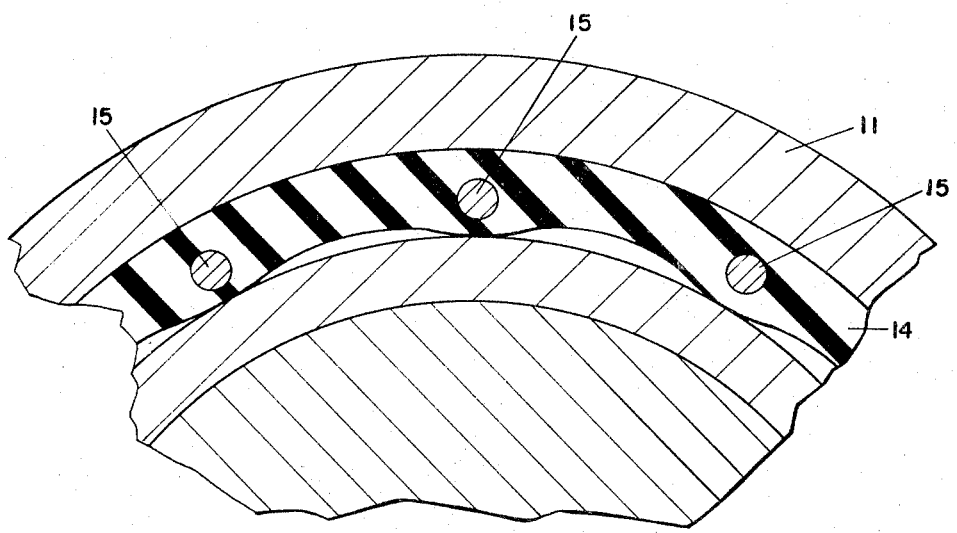
FIG. 2 is a partial cross sectional view taken on line 2—2 of FIG. 1.

Now with more particular reference to the drawings and particularly to the embodiment of the invention shown in FIGS. 1 and 2, a seal is shown that is designed to act radially on a sleeve surrounding a propeller shaft. The drawings show a one-piece housing 11 flexibly attached to the hull 12 of a ship or the like through the bonded shear section assembly 42 made up of members 13, 25, and 40. This assembly is bonded to housing 11 by an epoxy resin. These shear sections are annually members which have their flat faces bonded to the neoprene sealing washers 25. The shear sections 42 may be made in halves to enable them to be replaced readily and they are held to the hull 12 by means of studs 26.

The hollow generally cylindrical sealing element 14 is mounted within the tapered bore of the housing 11. The element 14 has rods 15 imbedded therein and bonded thereto. The inside surface of the sealing element 14 has spaced inner circumferential grooves 16, which act in a manner approximating a labyrinth type of seal. These grooves could be a multiplicity of dimples for lubricant retention. The outside surface of the sealing element has an annular groove 17 formed therein approximately midway between the ends of the sealing element. This annular groove communicates with a source of high pressure water which may be inserted through the passage 18 from a suitable source of high pressure water.

The neoprene sealing element 14 is capable of being molded in a flat section and to any suitable length. Different shaft diameters may be accommodated by cutting the molded strap to appropriate lengths. The axial joint between the ends of the sealing elements may be coated with adhesive before inserting them into the bore of the housing, and drawing the assembly up tight against the ends of the metal rods with the retainer ring 19 which is attached to the housing 11 by means of suitable studs or the like.

A simple split ring type of flinger 20 is held on the shaft by squeezing it in a resilient ring 27 in the space between the split finger and the split retaining ring 21. These two members are held together by studs 28.

The finger 20 has an outwardly directed flange 29, which runs in the space between retainer ring 19 and ring 30.

In operation, assuming the propeller to be at the left, it is presumed that an "inner tube" type static seal could be used to exclude waterd uring assembly and disassembly of the seal elements. With the seal assembled and the static seal retracted, external water pressure would attempt to force water between the seal and the shaft from left to right. Water reaching the right hand end of the seal would be trapped at the flinger, and drained at outlet drain 22 to some appropriate sump.

In order to establish the minimum leakage compatible with friction torque and temperature rise, water at some pressure above that external to the hull would be supplied at passage 18, producing a radially inward pressure on the sealing element, thereby balancing the hydraulic forces on the seal. Further, since the radial sections through the rods are stiffer radially than the sections between the rods, conditions are ideal for the formation of tapered lands (one per rod) to facilitate hydrodynamic lubrication of the surfaces as a bearing.

The leakage rate as a function of pressure on the outside of the seal to produce the best balance of contact pressure between the seal and the shaft and thermal control may be determined by test on an individual bearing size. Proper proportioning of the sealing element might very well permit this balance to be completely automatic by eliminating the high pressure hydraulic inlet and substituting a drilled passage to the external side of the seal housing. This would place external water pressure behind the seal and this pressure would increase or decrease automatically as the depth of submergence varied.

Figure 3:
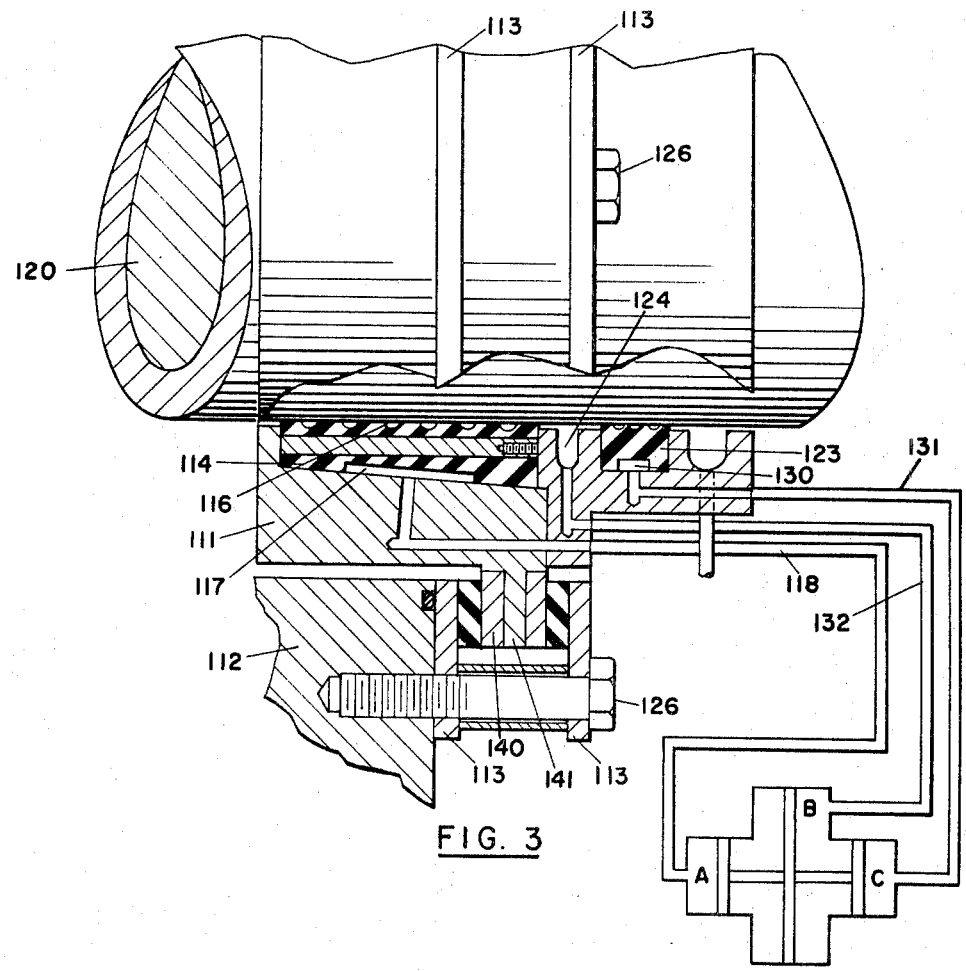
FIG. 3 is a view similar to FIG. 1 of another embodiment of the invention.

In the embodiment of the invention shown in FIG. 3, a bearing is shown similar to the one previously described, except that the flinger has been removed and a combination pressure chamber and seal substituted therefor. A pressure seal 123 may be made of a continuous length of resilient material and cut off and joined in a manner similar to that described in the previous embodiment. This seal has its external groove 130 connected to a suitable source of fluid under pressure by means of the pipe 131. A pressure groove 124 is similarly connected to a second cylinder through a pipe 132.

The annular space 117 around the outside of the sealing element 114 is connected to a suitable source of fluid under pressure by means of a passage 118. The shaft 120 is received in the sealing element 114 and adjacent to it are received the annular grooves 116 which are formed on the inside of the sealing element 114. The hull 112 is attached to the annular bonded shear sections 113 by means of studs 126 as in the other embodiment.

In operation, water may attempt to enter the main seal from the left hand side of the drawing. In this case, it passes to the pressure groove 124, raising the pressure in this space until leakage begins past the pressure seal 123. As the pressure in pressure groove 124 continues to rise, it increases the pressure on the piston cylinder B, moving it to the left. This increases the pressure on the outside of the sealing element 114 through passage 118 and into annular space 117. The pressure on the outside of the sealing element 114 is then increased and the pressure on the outside of the pressure seal 123 is decreased. This tends to decrease leakage through the sealing element and increases leakage through the pressure seal. Appropriate sizing of cylinders A, B, and C and proper calibration will affect the proper balance of the pressure to maintain adequate, yet minimal, flow through the seal. Leakage will be carried away to the appropriate drain as in the embodiment shown in FIGS. 1 and 2.

In the embodiment of the invention shown in FIGS. 4 and 5, a hollow body 201 which may be made in the form of a sintered bronze shell has a flange 250 attached to one end. The hollow body 201 has two generally cylindrical sections of rubber lining indicated at 202 fixed to the inside thereof. Since the two cylindrical sections 202 are symmetrically located in the shell, only one section is shown. Each cylindrical section 202 has a cylindrical bore 203 which has a smooth cylindrical inside surface and has no grooving of any kind in it. The end adjacent the center of the coupling has a counterbore 204 as shown. The outboard end of the cylindrical sections 202 terminates in a lip 205 which is formed by the tapered end of the cylindrical sections 202.

Three grooves 206 are formed in the outside periphery of the cylindrical sections 202. These grooves extend axially and are spaced one hundred twenty degrees apart as shown. The grooves extend along the outside diameter of the rubber in an axial direction as shown. The grooves 206 are open at the outboard end but are closed at the inboard end at 215. The grooves 206 extend over and overlap the counterbore 204. Since the ouside area of the lip 205 is of greater magnitude than that of the bore which it overlies, when the engine is shunt down and the propeller shaft 207 is at rest, the external water pressure in the grooves 206 will cause the lip 205 to hug the shaft and no water can enter the bearing.

When the engine is started, cooling water will be connected to the bearing at 208 and thus to the counterbore 204. Since the pressure of the cooling water in counterbore 204 exceeds the pressure of the water outside the bearing adjacent the end 220, the cooling water attempts to move axially along the propeller shaft 207. The three grooves 206 are free to expand radially, allowing clean water to pass along the shaft between the sleeve and the shaft and be expelled at the outboard end of the bearing. When the clutch is engaged and the shaft begins to rotate, the flexible rubber at the grooves assumes an ideal shape to develop a hydro-dynamic wedge and the water film then lubricates the three load supporting areas of the bearing.

In the embodiment of the invention shown in FIGS. 6 and 7, an alternate form of the bearing is shown. In this alternate shown in FIGS. 6 and 7, the same configuration is provided except that instead of the longitudinal grooves 206 formed in the rubber sleeves as in the embodiment of FIGS. 4 and 5, the grooves 306 are formed in the metal sleeve itself.

In FIGS. 6 and 7, the numerals for corresponding parts to those shown in FIGS. 4 and 5 are the same except that 300 is added to the number instead of 200 as in the embodiment of the invention shown in FIGS. 4 and 5.

In the embodiment shown in FIGS. 6 and 7, a body 301 is shown having two cylindrical sections 302 of rubber lining. The two cylindrical sections 302 are symmetrically located in the shell and each of these sections has a cylindrical bore 303 which is smooth with no grooving of any kind in it. The end of the bearing adjacent the center has a counterbore 304 as shown. The outboard end terminates in a lip 305 formed by the end of the sleeve.

Three grooves 306 are formed in the outside periphery of the metal body in this embodiment spaced one hundred twenty degrees apart. These grooves correspond to the grooves 206 in the embodiment shown in FIGS. 4 and 5. The grooves 306 extend along axially in the inside of the sleeve and overlie the rubber in this area. The grooves 306 are open at the outboard end but closed at the inboard end at 315. The grooves 306 extend over and overlie the counterbore 304.

Since the outside area of the lip 305 exceeds that of the bore, with the engine shut down and the propeller shaft 307 at rest, external water pressure in grooves 306 causes the lip 305 to hug the shaft and no water can enter the bearing. When the engine is started, cooling water pumped to the bearing enters the center of the bearing 308 and the counterbore 304. Since the pressure of the water in counterbore 304 exceeds that of the water outside the bearing adjacent end 320, the cooling water attempts to move axially along the propeller shaft. The rubber lining expands into the three grooves 306 which allow the lining to expand radially, allowing clean water to pass along the shaft between the sections 302 and the shaft 307 and be expelled at the outboard end of the bearing.

When the shaft begins to rotate, the flexed rubber at the three grooves assumes an ideal shape to develop a hydrodynamic wedge and the water film then lubricates the three load supporting areas of the bearing.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A shaft seal and a rotating shaft comprising
   a sealing element made of resilient material and having a generally cylindrical inner surface receiving said shaft,
   circumferentially spaced axially extending elongated rigid members imbedded in said sealing element,
   said rigid members rendering the areas of said sealing element spaced from said rigid members softer than the areas adjacent thereto,
   said softer areas being deformed from said shaft whereby spaces for lubricant are provided between said shaft and said sealing element and means admitting lubricant to said spaces,
   said sealing element is disposed in a housing and an annular space is provided between said housing and the outer periphery of said sealing element,
   said space between said housing and said sealing element being adapted to receive fluid under pressure whereby said sealing element is deflected toward said shaft.

2. The shaft seal recited in claim 1 wherein
   an annular pressure seal is disposed concentric to said shaft seal, and adapted to be supported on a shaft,
   said pressure seal comprising an annular member,
   rigid retainer means disposed around the outside of said pressure seal,
   said pressure seal being adapted to engage said shaft at a position spaced from said sealing element,
   and an annular chamber between said sealing element and said pressure seal.

3. The shaft seal recited in claim 2 wherein
   drain means is connected to said pressure chamber.

4. The shaft seal recited in claim 3 wherein
   an annular space is provided between said pressure seal and said retainer means,
   and means is provided to insert fluid under pressure into said annular space.

5. The shaft seal recited in claim 4 wherein
   a first, a second, and a third cylindrical member is provided,
   a piston is disposed in each said cylindrical member,
   said pistons being connected together for axial movement in said cylinder,
   said space between said sealing element and said housing being connected in fluid flow relation to said first cylinder,
   said space between said pressure seal and said housing being connected in fluid flow relation to said space between said second cylinder,
   and said pressure chamber being connected in fluid flow relation to said third cylinder whereby flow of fluid through said shaft seal is regulated.

6. The shaft seal recited in claim 1 wherein
   spaced circumferential grooves are provided around the inner periphery of said sealing element.

References Cited

UNITED STATES PATENTS

| | | | |
|---|---|---|---|
| 2,244,135 | 6/1941 | Wallace | 277—209 |
| 2,841,422 | 7/1958 | Badger | 277—207 X |
| 3,243,240 | 3/1966 | Arthur | 308—36.1 |
| 759,339 | 4/1932 | Lamb | 277—35 X |
| 1,942,366 | 1/1934 | Seamark | 277—34 X |
| 2,219,519 | 10/1940 | Fabrin. | |
| 2,380,715 | 7/1945 | Aker | 308—238 |
| 2,648,554 | 8/1953 | Gilbert | 277—34 |
| 2,737,404 | 3/1956 | Lapsley | 308—3.5 |
| 2,779,419 | 1/1957 | Mounce | 277—70 X |
| 2,806,748 | 9/1957 | Krotz | 308—36.1 |
| 2,946,608 | 7/1960 | Gilbert | 308—36.1 |
| 2,960,332 | 11/1960 | Lindou | 277—3 |
| 3,042,125 | 7/1962 | Duncan. | |
| 3,246,902 | 4/1966 | Harrison | 277—34 |
| 3,261,611 | 7/1966 | Maidment | 277—34 |
| 3,268,275 | 8/1966 | Laughlin | 308—4 |

FOREIGN PATENTS

| | | |
|---|---|---|
| 1,053,600 | 2/1954 | France. |
| 142,529 | 3/1962 | U.S.S.R. |

MARTIN P. SCHWADRON, *Primary Examiner.*

L. L. JOHNSON, *Assistant Examiner.*